United States Patent [19]

White, Jr.

[11] 4,045,645

[45] Aug. 30, 1977

[54] WELDING PROCESS FOR SLOTTED TUNGSTEN ROD

[75] Inventor: Robert S. White, Jr., Beverly, Mass.

[73] Assignee: GTE Sylvania Incorporated, Danvers, Mass.

[21] Appl. No.: 664,342

[22] Filed: Mar. 5, 1976

[51] Int. Cl.$^2$ .............................................. B23K 11/16

[52] U.S. Cl. ................................ 219/118; 29/630 A; 219/91

[58] Field of Search ..................... 219/118, 117 R, 91, 219/72; 29/628, 630 A; 313/318

[56] References Cited

U.S. PATENT DOCUMENTS

| | | | |
|---|---|---|---|
| 3,523,173 | 8/1970 | Lull | 219/91 |
| 3,566,008 | 2/1971 | Ettlinger | 219/117 |
| 3,668,456 | 6/1972 | Anderson | 219/118 |

*Primary Examiner*—E. A. Goldberg
*Attorney, Agent, or Firm*—James Theodosopoulos

[57] ABSTRACT

In the process of inserting and fastening a thin molybdenum ribbon into the slot of a slotted tungsten rod, for use in the press seal of a high silica glass lamp envelope, a two step welding process is used. The first weld is made with the two welding electrodes at the internal end of the slot. The second weld is made with the electrodes closer to the end of the rod.

5 Claims, 4 Drawing Figures

WELDING PROCESS FOR SLOTTED TUNGSTEN ROD

THE INVENTION

This invention relates to electric lamps having a high silica glass envelope, a press seal at one end of the envelope and a refractory metal ribbon embedded within the press seal. It particularly relates to the embedded connection between the ribbon and a lead-in wire or rod.

A method for making such a connection is shown in U.S. Pat. No. 3,668,456 the disclosure of which is incorporated herein by reference. There, the refractory metal ribbon is inserted into the slotted rod and the sides of the slot are closed onto the ribbon at an elevated temperature by means of two welding electrodes. A problem with such a process is that occasionally the slotted rod breaks at the end of the slot. This invention concerns an improved process which reduces such breakage.

In accordance with this invention, the welding of the ribbon to the rod is accomplished in two steps. First, after the ribbon is inserted in the slot, the welding electrodes are applied to the end of the slot. Next, they are applied closer to the end of the rod to secure the ribbon within the slot.

Figure 2:
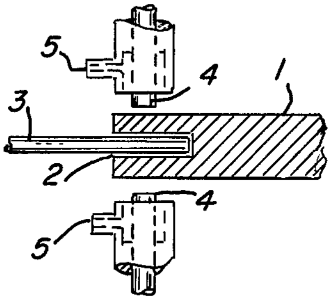
FIG. 2 is a diagramatic representation of apparatus for welding the rod of FIG. 1.

In the prior art, as shown in FIG. 2, a rod 1 has a slot 2 at one end thereof. One end of a metal ribbon 3 is inserted into slot 2 and the walls of slot 2 are compressed between electric welding electrodes 4 at a point closer to the end of rod 1 than to the internal end of slot 2. During this welding step, an inert or reducing atmosphere is maintained at the work area by means of passages 5.

Figure 1:
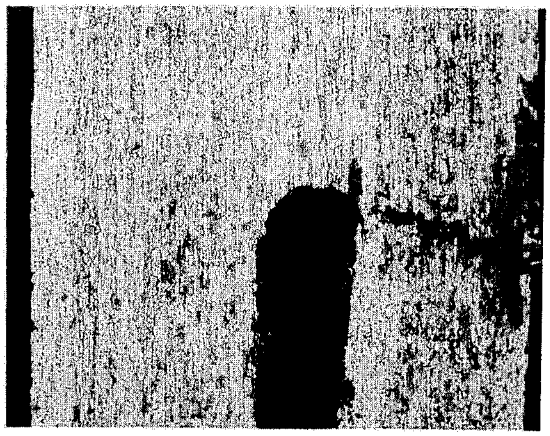
FIG. 1 PRIOR ART
FIG. 1 is a photograph of a prior art slotted rod showing the grain structure thereof.

FIG. 1 shows the type of break that can occur at the end of slot 2 as a result of the process of FIG. 1.

Figure 4:
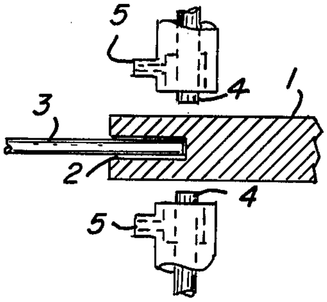
FIG. 4 shows the manufacture of the rod of FIG. 3.

In a process in accordance with this invention, the first welding step is made at the end of slot 2, as shown in FIG. 4. Then a second welding step, of the type shown in FIG. 2, is applied to make the secure connection between the ribbon 3 and rod 1.

In a specific example, rod 1 was 45 mils in diameter, made of tungsten. Slot 2 was diametrically formed at one end of rod 1, the slot being 6 mils thick and about 60 to 80 mils deep. Molybdenum ribbon 3 was rectangular, measuring about 3/16 inch by $\frac{3}{8}$ inch, and was about 1.3 mils thick at its center. A long end of ribbon 3 was centrally inserted into slot 2 and the rod was then placed between two welding electrodes 4 so that electrodes 4 were positioned at about the internal end of slot 2. Welding electrodes 4 were made of thoriated tungsten and had a diameter at their tip of about 1/16 inch.

Electrodes 4 were then closed onto rod 1 with a closing force of about 7 pounds while sufficient electric current was passed therebetween to heat the portion of rod 1 between electrodes 4 to about 1500° or 1600° C. During this step an atmosphere of forming gas (15% $H_2$, 85% $N_2$) was maintained at the work area by means of passages 5 to prevent any oxidation of the metal.

After this step, a second weld was made in the same manner but with electrodes 4 moved closer to the end of rod 1, about as shown in FIG. 2. This second step accomplished the actual clamping of the sides of slot 2 onto ribbon 3.

Figure 3:
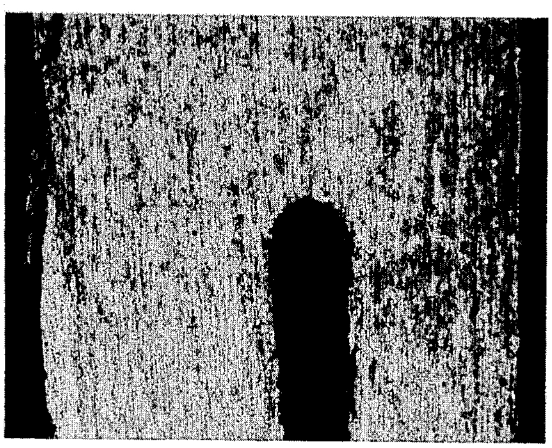
FIG. 3 is a photograph of a slotted rod in accordance with this invention.

As shown in FIG. 3, the microstructure of a rod welded in accordance with this invention is more fibrous, and therefore less brittle, than that of a prior art rod, shown in FIG. 1.

I claim:

1. In the process of connecting a refractory metal ribbon to a refractory metal rod having a diametrical slot at one end thereof, for embedment in a press seal of an electric lamp having a high silica glass envelope, the improvement which comprises inserting the ribbon into the slotted rod, making a first weld on the rod at about the internal end of the slot by closing a pair of electrodes thereon and passing electric current between the electrodes, and then making a second electric weld on the slotted portion of the rod at about the external end of the slot, the second weld closing the sides of the slot onto the ribbon.

2. The process of claim 1 wherein the ribbon is molybdenum.

3. The process of claim 1 wherein the rod is tungsten.

4. The process of claim 1 wherein the portion of the rod between the electrodes is electrically heated to between about 1500° to 1600° C during each welding step.

5. The process of claim 1 wherein an inert or reducing atmosphere is maintained at the weld area during each welding step.

* * * * *